US011163300B2

(12) United States Patent
Engle et al.

(10) Patent No.: US 11,163,300 B2
(45) Date of Patent: Nov. 2, 2021

(54) NAVIGATING AN AUTONOMOUS VEHICLE BASED UPON AN IMAGE FROM A MOBILE COMPUTING DEVICE

(71) Applicant: GM GLOBAL TECHNOLOGY OPERATIONS LLC, Detroit, MI (US)

(72) Inventors: Stephanie Olivia Engle, San Francisco, CA (US); Bradley David Ryan, San Francisco, CA (US); Cade Thurlby, Oakland, CA (US); Mariya Jacobo, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 16/106,873

(22) Filed: Aug. 21, 2018

(65) Prior Publication Data

US 2020/0064826 A1    Feb. 27, 2020

(51) Int. Cl.
| | | |
|---|---|---|
| *G05D 1/00* | (2006.01) | |
| *G05D 1/02* | (2020.01) | |
| *G06Q 10/02* | (2012.01) | |
| *G06Q 50/30* | (2012.01) | |
| *G01C 21/34* | (2006.01) | |

(52) U.S. Cl.
CPC ....... *G05D 1/0016* (2013.01); *G01C 21/3438* (2013.01); *G05D 1/0088* (2013.01); *G05D 1/0246* (2013.01); *G05D 1/0276* (2013.01); *G06Q 10/02* (2013.01); *G06Q 50/30* (2013.01); *G05D 2201/0213* (2013.01)

(58) Field of Classification Search
CPC .. G05D 1/0016; G05D 1/0088; G05D 1/0246; G05D 1/0276; G05D 2201/0213; G01C 21/3438; G06Q 10/02; G06Q 50/30
See application file for complete search history.

(56) References Cited

U.S. PATENT DOCUMENTS

| | | | |
|---|---|---|---|
| 9,953,283 B2 | 4/2018 | Sweeney et al. | |
| 9,970,615 B1* | 5/2018 | Cardillo | ................. F21S 43/14 |
| 10,477,159 B1* | 11/2019 | Fredinburg | ............ H04N 7/183 |
| 2008/0215202 A1 | 9/2008 | Breed | |
| 2015/0339928 A1 | 11/2015 | Ramanujam | |
| 2016/0116912 A1 | 4/2016 | Nehmadi et al. | |
| 2016/0370194 A1 | 12/2016 | Colijn et al. | |
| 2017/0052537 A1 | 2/2017 | Salinas | |

(Continued)

*Primary Examiner* — Navid Ziaeianmehdizadeh
(74) *Attorney, Agent, or Firm* — Medley, Behrens & Lewis, LLC

(57) ABSTRACT

An autonomous vehicle receives geographic location data defined via a mobile computing device operated by a user. The geographic location data is indicative of a device position of the mobile computing device. The autonomous vehicle also receives image data generated by the mobile computing device. The image data is indicative of a surrounding position nearby the device position. The surrounding position is selected from an image captured by a camera of the mobile computing device. A requested vehicle position (e.g., a pick-up or drop-off location) is set for a trip of the user in the autonomous vehicle based on the geographic location data and the image data. A route from a current vehicle position of the autonomous vehicle to the requested vehicle position for the trip of the user in the autonomous vehicle is generated. Moreover, the autonomous vehicle can follow the route to the requested vehicle position.

20 Claims, 9 Drawing Sheets

(56) References Cited

U.S. PATENT DOCUMENTS

| | | | |
|---|---|---|---|
| 2018/0202822 A1* | 7/2018 | DeLizio | G01C 21/3407 |
| 2018/0341274 A1* | 11/2018 | Donnelly | G08G 1/096827 |
| 2018/0357907 A1* | 12/2018 | Reiley | H04W 4/44 |
| 2019/0129438 A1* | 5/2019 | Morita | G01C 21/3623 |
| 2019/0166473 A1* | 5/2019 | Venkatraman | G01C 21/3438 |
| 2019/0286928 A1* | 9/2019 | Hubschman | G06K 9/00288 |

\* cited by examiner

NAVIGATING AN AUTONOMOUS VEHICLE BASED UPON AN IMAGE FROM A MOBILE COMPUTING DEVICE

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Conventionally, when a user would like an autonomous vehicle to pick him or her up at a specified location, a mobile computing device of the user (e.g., a smartphone) receives input from the user indicative of the specified location (e.g., an address) for pick-up and a desired location for drop-off. Alternatively, the mobile computing device may employ a geocoding system (e.g., concise spatial query and representation system (C-Squares), Universal Transverse Mercator (UTM) coordinates, latitude and longitude coordinates, etc.) to ascertain the specified location. The mobile computing device causes data indicative of the specified location to be received by the autonomous vehicle, and the autonomous vehicle then generates and follows a route to the specified location based upon the data. Once at the specified location, the user may enter the autonomous vehicle and the autonomous vehicle may then transport the user to the specified location.

Using only an address and/or a geocoding system to specify a pick-up location for an autonomous vehicle has various deficiencies. A user typically does not memorize addresses, and as such, the user may more easily recognize locations in terms of human sensory factors such as sight or sound. To illustrate, the user may frequent a coffee shop, but may not be aware of the address of the coffee shop. Instead, the user may remember that the coffee shop is located on his or her commute to work on the left-hand side of a particular street. Moreover, if the user is in an unfamiliar region, then the user may be unaware of information pertaining to his or her current location beyond information received from his or her senses.

Additionally, an address can span a large area and may have many possible pick-up and/or drop-off locations that all fall within the address. In an example, if the user has specified an address of a stadium as a pick-up location, the address may include regions that are undesirable or inconvenient for user pick-up (e.g., an area of a road immediately adjacent to an occupied bus stop, an area of a road with a large puddle, an area of a road with a temporary barricade between the road and a sidewalk, an area of a road in a construction zone, etc.). Moreover, many vehicles share similar visual characteristics, and it may be difficult for the user to identify the autonomous vehicle assigned to provide the ride for the user from amongst a plurality of vehicles (including other autonomous vehicles) in an area surrounding the user.

Use of geocoding systems in determining a pick-up or drop-off location also has various drawbacks. For instance, a mobile computing device may transmit GPS coordinates indicative of a current position of a user of the mobile computing device as pick-up coordinates, but the user may not actually want the pick-up location to be at his or her current position. While certain pick-up systems may enable the user to specify a pick-up location other than his or her current location, these systems may lack precision and the autonomous vehicle may arrive at a position that was not intended by the user.

SUMMARY

The following is a brief summary of subject matter that is described in greater detail herein. This summary is not intended to be limiting as to the scope of the claims.

Described herein are various technologies pertaining to controlling operation of an autonomous vehicle. More specifically, the technologies described herein enable an autonomous vehicle to navigate to a requested vehicle position indicated by an image captured by a camera of a mobile computing device operated by a user. Also described herein is a graphical user interface (GUI) that can be displayed on a display of the mobile computing device that indicates a presence of the autonomous vehicle at the requested vehicle position as a graphical overlay to an image.

According to various embodiments, an autonomous vehicle includes a vehicle propulsion system, a braking system, a steering system, and sensor systems. The autonomous vehicle also includes a computing system that is in communication with the vehicle propulsion system, the braking system, the steering system, and the sensor systems. The sensor systems produce sensor signals, and the computing system of the autonomous vehicle may control at least one of the vehicle propulsion system, the braking system, or the steering system based upon the sensor signals.

In operation, it is contemplated that a user may wish to be picked up or dropped off by an autonomous vehicle. As such, a mobile computing device operated by the user may capture an image utilizing a camera of the mobile computing device. The mobile computing device can be geographically located at a device position when the image is captured (e.g., the user can be assumed to be at the device position). Moreover, the image can be captured responsive to input of the user. The image can represent a location at which the autonomous vehicle desirably picks up or drops off the user for a trip in the autonomous vehicle; thus, an intended pick-up or drop-off location can be set by the user as being in a field of view of the camera of the mobile computing device when the image is captured by the mobile computing device. It is contemplated that the image can be a still image, a video (or a portion of a video), or the like.

The mobile computing device can further generate geographic location data. The geographic location data is indicative of the device position of the mobile computing device. For instance, when the image is captured, the geographic location data can be generated. In an example, the geographic location data can include global positioning system (GPS) coordinates of the device location, an address corresponding to the device location, an intersection of roads corresponding to the device location, or a name of a location corresponding to the device location.

Moreover, the mobile computing device can generate image data based upon the image. The image data is indicative of a surrounding position nearby the device position, where the surrounding position is selected from the image. It is contemplated that the surrounding position can be automatically selected from the image (e.g., without user input, selected by the mobile computing device, the autonomous vehicle, and/or a server computing system) or selected based on user input. The image data can include a distance between an object in the image at the surrounding position and the mobile computing device at the device position, a cardinal orientation of the camera of the mobile computing device when the image is captured, or a selected point within the image. The image data may also include the image.

In an embodiment, the mobile computing device may display the image to the user on a display of the mobile computing device. The mobile computing device can receive a selection (e.g., via user input) of a point within the image displayed on the display, wherein the point that is selected specifies the surrounding position; accordingly, the image data generated based upon the image can include data indicative of the point that is selected. In another embodiment, the mobile computing device may be configured to automatically select the surrounding position (e.g. selecting a point in a central region of the image, selecting the surrounding position based on an object detected in the image, etc.).

Further, the mobile computing device can transmit the geographic location data and the image data to the autonomous vehicle by way of a network. The geographic location data and the image data can cause the autonomous vehicle to traverse to a requested vehicle position corresponding to the surrounding position for the trip of the user in the autonomous vehicle. By way of illustration, the surrounding position can be an entrance of an arena, and the requested vehicle position corresponding to the surrounding position can be a location on a street in front of the entrance of the arena.

In particular, the autonomous vehicle can receive the geographic location data defined via the mobile computing device of the user and the image data generated by the mobile computing device. As noted above, the geographic location data can be indicative of the device position of the mobile computing device of the user, and the image data can be indicative of the surrounding position nearby the device position. The autonomous vehicle can set the requested vehicle position for the trip of the user in the autonomous vehicle based on the geographic location data and the image data. Moreover, the autonomous vehicle can generate a route from a current vehicle position of the autonomous vehicle to the requested vehicle position for the trip of the user in the autonomous vehicle. Subsequent to generating the route, the autonomous vehicle may control at least one of the vehicle propulsion system, the braking system, or the steering system to cause the autonomous vehicle to follow the route to the requested vehicle position.

Responsive to an arrival of the autonomous vehicle at the requested vehicle position, the autonomous vehicle may transmit a message (e.g., to the mobile computing device) indicative of the arrival of the autonomous vehicle at the requested vehicle position. The message may also include data indicative of the position of the autonomous vehicle; yet, the claimed subject matter is not so limited.

The mobile computing device may receive input from the user causing the mobile computing device to capture a second image utilizing the camera (e.g., after receiving the message indicative of the arrival of the autonomous vehicle). Subsequent to capturing the second image, the mobile computing device may display a GUI on a display of the mobile computing device. The GUI can include the second image captured utilizing the camera and a graphical overlay. The graphical overlay can indicate a presence of the autonomous vehicle at the requested vehicle position. The graphical overlay can highlight the autonomous vehicle within the second image with visual indicia. In an example, the visual indicia can be coloring, a pattern, or the like that overlays the second image. The mobile computing device can generate the graphical overlay of the GUI based on the second image and data included in the message received from the autonomous vehicle indicating that the autonomous vehicle has arrived at the requested vehicle position. Pursuant to an illustration, the second image may be generated from a live-view of video obtained using the camera of the mobile computing device. For instance, as a field of view of the camera is changed over time, the mobile computing device may modify the GUI to allow for identifying the autonomous vehicle (e.g., shown via the graphical overlay on the live-view of the video).

In an embodiment, subsequent to the autonomous vehicle arriving at the requested vehicle position, the mobile computing device can receive direction data indicative of a path (e.g., from a current position of the user) to the requested vehicle position. The mobile computing device may display the direction data as part of the GUI on the display of the mobile computing device (e.g., presented to the user). In a specific example, displaying the direction data may include presenting a series of graphical arrows within the graphical overlay of the GUI. Each arrow in the series of arrows may indicate a step to take in order to reach the requested vehicle position at which the autonomous vehicle is located.

In an example, an image can be captured utilizing the camera of the mobile computing device subsequent to the arrival of the autonomous vehicle at the requested vehicle position. At least a portion of the autonomous vehicle can be depicted in this image. Accordingly, the autonomous vehicle can be authenticated based on the image. Moreover, responsive to authenticating the autonomous vehicle, an authentication notification that indicates authentication of the autonomous vehicle in the image can be transmitted from the mobile computing device. The authentication notification can be received by the autonomous vehicle; responsive to receipt of the authentication notification from the mobile computing device, the autonomous vehicle can cause a door (or doors) of the autonomous vehicle to unlock.

It is to be appreciated that the requested vehicle position can be a pick-up location for the trip of the user in the autonomous vehicle. Alternatively, it is contemplated that the requested vehicle position can be a drop-off location for the trip of the user in the autonomous vehicle. Further, a drop-off location or a pick-up location for the trip of the user in the autonomous vehicle can be adjusted utilizing the techniques set forth herein (e.g., the drop-off location can be changed to the requested vehicle position while the user is riding in the autonomous vehicle utilizing the techniques set forth herein).

In various embodiments, a server computing system that is in network communication with the autonomous vehicle and the mobile computing device may perform some of the above-described functionality in place of the autonomous vehicle and/or the mobile computing device. For example, the server computing system may receive the geographic location data indicative of the device position and the image captured by the camera of the mobile computing device. Furthermore, the server computing system may select a surrounding position nearby the device position based on the image. Moreover, the server computing system can identify a requested vehicle position for a trip of the user in the autonomous vehicle based on the geographic location data and the surrounding position. The server computing system can transmit a command to the autonomous vehicle to cause the autonomous vehicle to traverse to the requested vehicle position for the trip of the user in the autonomous vehicle.

The above-described technologies present various advantages over conventional technologies relating to causing an autonomous vehicle to navigate to a pick-up or a drop-off location. For instance, by navigating based in part upon an image (and not solely on geographic location data), the autonomous vehicle may arrive at a pick-up or a drop-off location in a more efficient fashion, leading to faster pick-up/drop-off times. Moreover, the GUI displayed on the display of the mobile computing device enables faster detection of the autonomous vehicle by the user as compared to conventional methods. Further, the techniques set forth herein allow for the user to alter the pick-up or drop-off location in an efficient manner, without needing to go through the cumbersome process of changing an address for the pick-up or drop-off. According to an illustration, the user may desire to be dropped off at a particular entrance to a theater (which may be a modification as compared to an original drop-off location); use of the camera of the mobile computing device enables the drop-off location to be changed (e.g., while the user is in the autonomous vehicle), which otherwise may be difficult and time consuming to alter (e.g., since there is no driver that the user can ask to stop the car at the particular entrance of the theater).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
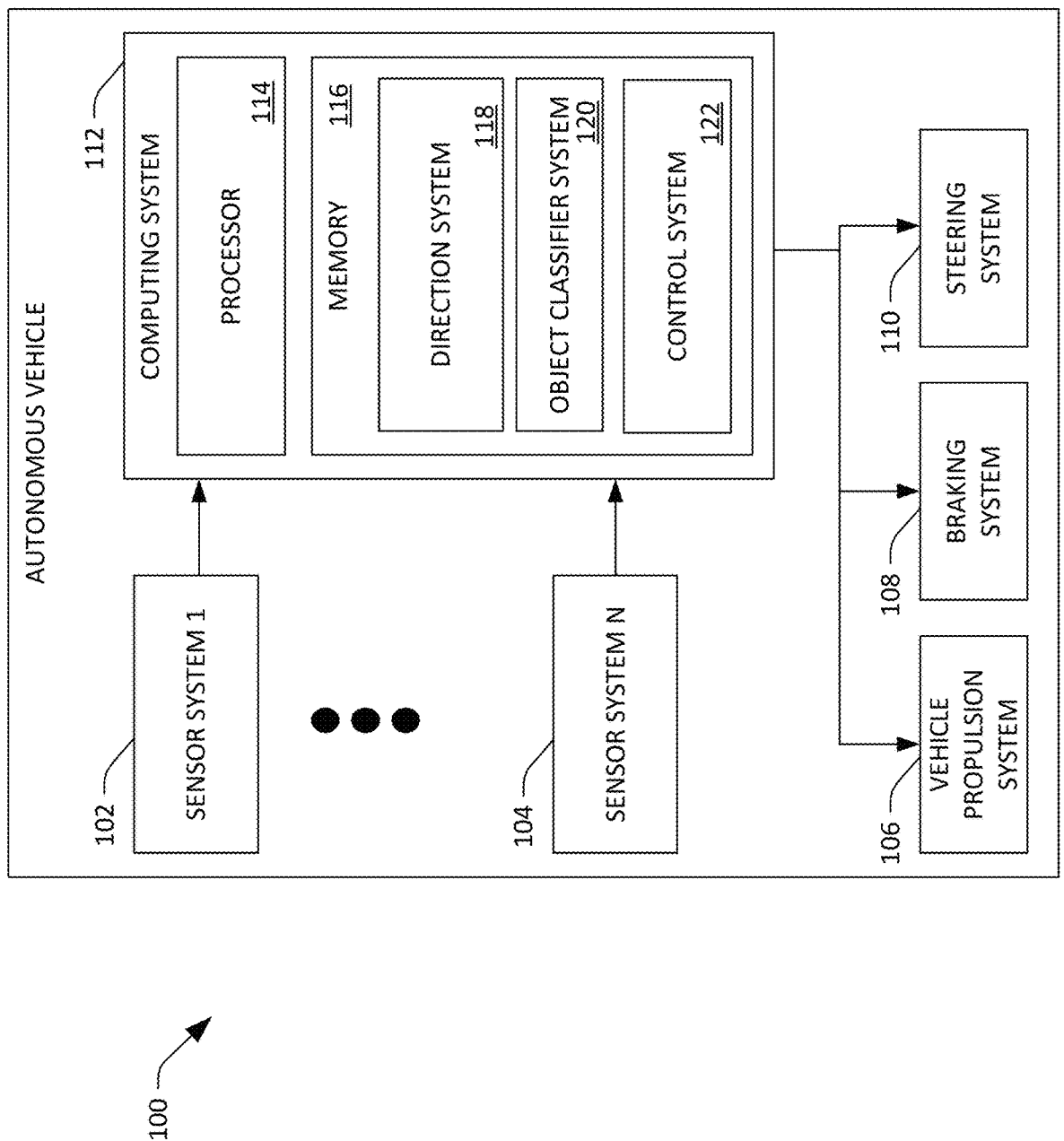
FIG. 1 illustrates a functional block diagram of an exemplary autonomous vehicle.

Various technologies pertaining to controlling operation of an autonomous vehicle are now described with reference to drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a lidar sensor system and the Nth sensor system 104 may be a camera (image) system. Other exemplary sensor systems include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may be an electric motor, an internal combustion engine, or a combination thereof. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like. The memory includes a direction system 118 (described in greater detail below) that is configured to set a requested vehicle position for a trip of a user in the autonomous vehicle 100 and generate a route to the requested vehicle position. The requested vehicle position can be a pick-up location for the trip of the user in the autonomous vehicle 100 or a drop-off location for the trip of the user in the autonomous vehicle 100. The direction system 118 can set the requested vehicle position for the trip based upon geographic location data and image data generated by a mobile computing device.

The memory 116 also includes an object classifier system 120. The object classifier system 120 is generally configured to assign labels to objects (in proximity to the autonomous vehicle 100) captured in sensor signals output by the sensor systems 102-104.

The memory 116 additionally includes a control system 122 that is configured to receive output of the direction system 118 (e.g., image data) and/or the object classifier system 120, and is further configured to control at least one of the mechanical systems of the autonomous vehicle 100 (the vehicle propulsion system 108, the braking system 110, and/or the steering system 112) based upon the output of the object classifier system 120 and/or the direction system 118.

Figure 2:
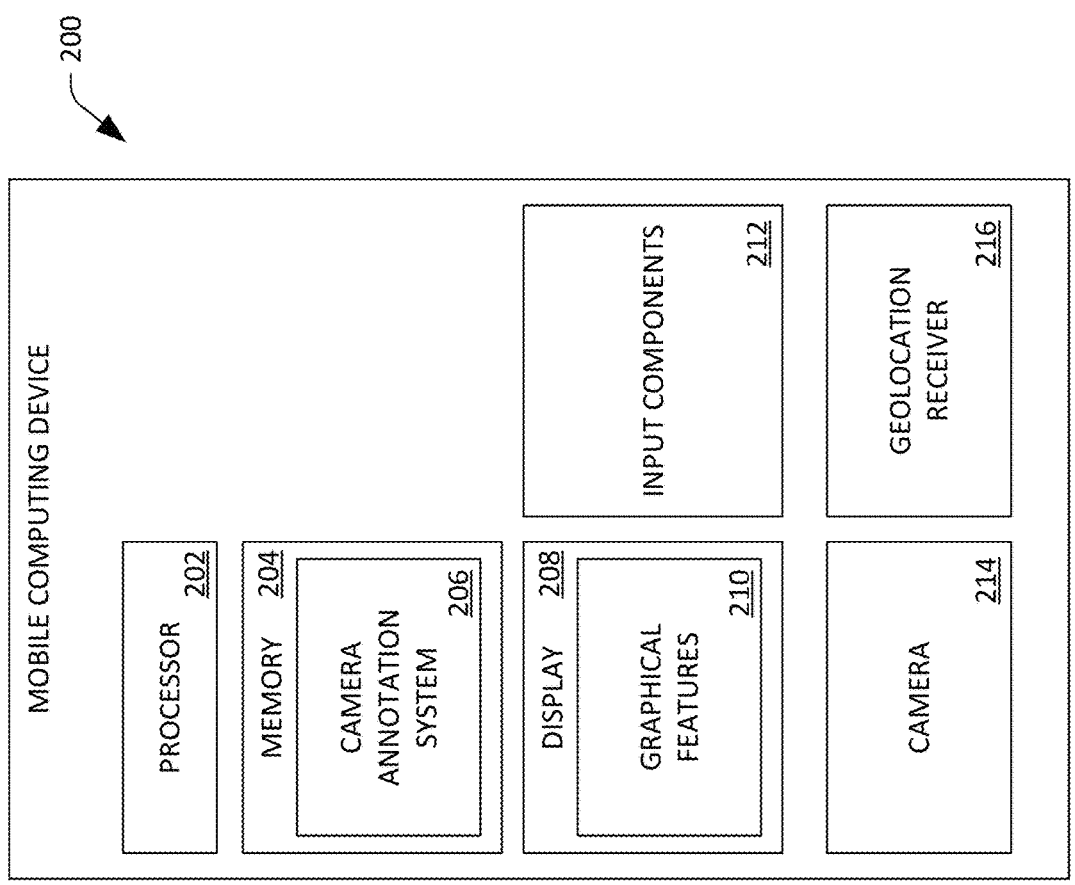
FIG. 2 illustrates a functional block diagram of an exemplary mobile computing device.

With reference to FIG. 2, an exemplary mobile computing device 200 is illustrated. The mobile computing device 200 includes a display 208 whereupon graphical features 210 can be presented. The mobile computing device 200 further includes a camera 214 configured to capture images (e.g., still images, video, etc.). The mobile computing device 200 also includes a processor 202 and memory 204 that includes computer-executable instructions that are executed by the processor 202. The memory 204 comprises a camera annotation system 206. As will be described in greater detail below, the camera annotation system 206 is configured to cause the autonomous vehicle 100 to navigate based upon an image captured by the camera 214 of the mobile computing device 200. The camera annotation system 206 is also configured to present a graphical user interface (GUI) on the display 208 of the mobile computing device (described in greater detail below). For instance, the GUI may be part of the graphical features 210.

The mobile computing device 200 also comprises input components 212 which are configured to receive input from a user. For example, the input components 212 can be or include a touchscreen, a microphone, a button, a capacitive sensor, a combination thereof, or the like. The mobile computing device 200 can also include a geolocation receiver 216 that can detect a device position of the mobile computing device 100. For example, the geolocation receiver 216 can receive global positioning system (GPS) data, wherein the GPS data is indicative of the device position of the mobile computing device 200. However, it is contemplated that the geolocation receiver 216 is not limited to the foregoing example (e.g., the device position of the mobile computing device 200 can be detected by the geolocation receiver 216 in other manners). The mobile computing device may also comprise a data store (not shown).

Figure 3:
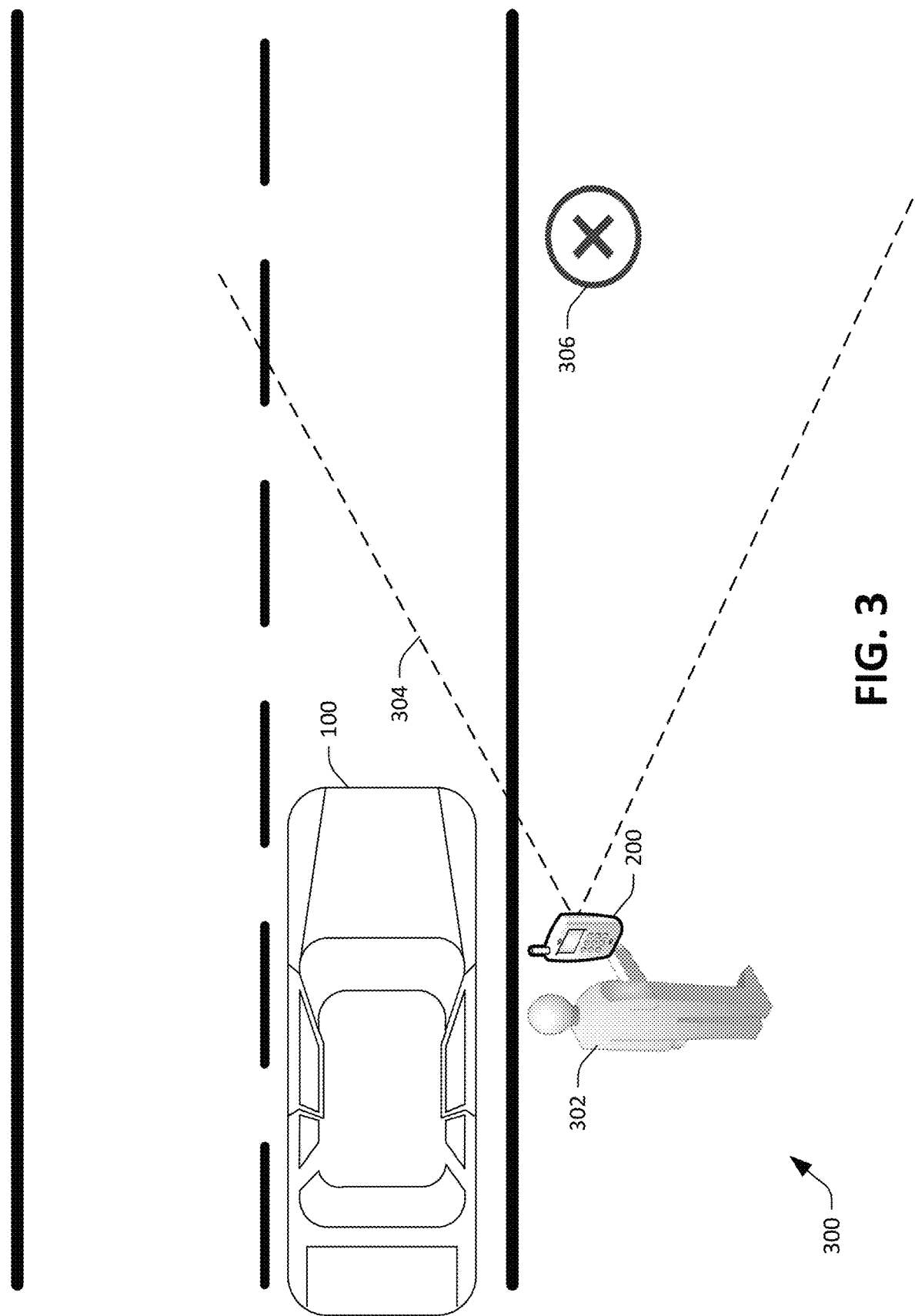
FIG. 3 illustrates an exemplary overhead view showing a driving environment of an autonomous vehicle that navigates based upon image data received from a mobile computing device.

With reference now to FIG. 1-3, exemplary operation of the autonomous vehicle 100 is now set forth. FIG. 3 depicts a top view of an exemplary driving environment 300. It is contemplated that a user 302 is in the driving environment 300 and that the user 302 wishes to be picked-up by an autonomous vehicle (e.g., the autonomous vehicle 100). Although the autonomous vehicle 100 is depicted as initially being in the driving environment 300 in FIG. 3, it is to be understood that the autonomous vehicle 100 may initially be located outside of the driving environment 300. Moreover, it is to be appreciated that the example depicted in FIG. 3 can be extended to a scenario in which the user 302 desirably sets a drop-off location.

In order to effectuate pick-up by the autonomous vehicle 100, the mobile computing device 200 (e.g., the camera annotation system 206) operated by the user 302 may receive input from the user 302. Responsive to the input, the camera annotation system 206 may cause the camera 214 of the mobile computing device 200 to capture an image of a field of view 304. The mobile computing device 200 can be geographically located at a device position when the image is captured. The device position is the geographic location of the mobile computing device 200 when the image is captured, and the user 302 can be assumed to be at the device position. Moreover, the image can represent a location at which the autonomous vehicle 100 desirably picks up the user 302 for a trip in the autonomous vehicle 100. Accordingly, an intended pick-up location can be set by the user 302 as being in the field of view 304 when the image is captured by the camera 214 of the mobile computing device 200. According to an example, the image captured by the camera 214 of the mobile computing device 200 can be a still image. Pursuant to another example, the image captured by the camera 214 of the mobile computing device 200 can be a video (or a portion of a video).

Moreover, the camera annotation system 206 can cause the geolocation receiver 216 to detect the device position (e.g., when the image is captured responsive to the input). Thus, the camera annotation system 206 can generate geographic location data, where the geographic location data is indicative of the device position of the mobile computing device 200 corresponding to when the image is captured. In various examples, the geographic location data may be global position system (GPS) coordinates at which the mobile computing device 200 is located, an address at which the mobile computing device 200 is located, an intersection of roads at which the mobile computing device 200 is located, a name of a location at which the mobile computing device 200 is located, a combination thereof, or the like.

The camera annotation system 206 of the mobile computing device 200 can further generate image data based upon the image. The image data is indicative of a surrounding position 306 nearby the device position, where the surrounding position 306 is selected from the image. Pursuant to an example, the surrounding position 306 can be automatically selected from the image (e.g., without user input, automatically selected by the camera annotation system 206). According to another example, the surrounding position 306 can be selected based on user input. The image data can include a distance between an object in the image at the surrounding position 306 and the mobile computing device 200 at the device position, a cardinal orientation of the camera 214 of the mobile computing device 200 when the image is captured, or a selected point within the image. The image data may also include the image.

In an embodiment, the camera annotation system 206 of the mobile computing device 200 may display the image to the user 302 on the display 208 of the mobile computing device 200. The mobile computing device 200 can receive a selection (e.g., user input via the input components 212) of a point within the image displayed on the display 208, wherein the point that is selected specifies the surrounding position 306; accordingly, the image data generated by the camera annotation system 206 based upon the image can include data indicative of the point that is selected. Pursuant to an illustration, the image displayed on the display 208 can include a restaurant and a store across a street from each other; following this illustration, the user 302 can select the store (e.g., the point within the image) as being the surrounding position 306. In another embodiment, the camera annotation system 206 of the mobile computing device 200 may be configured to automatically select the surrounding position (e.g. selecting a point in a central region of the image, selecting the surrounding position based on an object detected in the image, etc.). For instance, points of interest in a geographic region can be predefined; if the image includes one of these points of interest, then such point can be automatically selected.

According to an illustration, the mobile computing device 200 may present the image to the user 302 on the display 208 (e.g., within a GUI). The mobile computing device 200 may receive input from the user indicative of a selected point within the image, wherein the selected point is indicative of the surrounding position 306 nearby the device position. In certain embodiments, points may be predefined with visual markers overlaying the image in the GUI, and the mobile computing device 200 may receive a selection of one of the predefined points within the image.

Further, the mobile computing device 200 can transmit the geographic location data and the image data to the autonomous vehicle 100 by way of a network. The geographic location data and the image data can cause the autonomous vehicle 100 to traverse to a requested vehicle position corresponding to the surrounding position 306 for the trip of the user in the autonomous vehicle. By way of illustration, the surrounding position 306 can be a bench on a sidewalk, and the requested vehicle position corresponding to the surrounding position 306 can be a location on a street in adjacent to the bench on the sidewalk. In the example depicted in FIG. 3, the requested vehicle position can be a pick-up location for the trip of the user 302 in the autonomous vehicle 100; yet, it is contemplated that the techniques set forth herein can similarly be utilized to set a drop-off location (e.g., the image can be captured while the user 302 is riding in the vehicle 100 to control setting the drop-off location)

In an embodiment where the autonomous vehicle 100 has not yet begun navigation, the autonomous vehicle 100 may generate a route from a current position of the autonomous vehicle to the requested vehicle position based upon the geographic location data and the image data. For instance, the geographic location data can provide an initial region (e.g., a destination) for the autonomous vehicle 100 and the image data can provide a refined sub-region which the autonomous vehicle 100 will set as the end of the route. The autonomous vehicle 100 may then control at least one of the vehicle propulsion system 106, the braking system 108, or the steering system 100 to cause the autonomous vehicle 100 to follow the route to the requested vehicle position. In another embodiment in which the autonomous vehicle 100 has already begun navigation, the autonomous vehicle 100 may modify its route in order to arrive at the requested vehicle position indicated by the image.

In particular, the autonomous vehicle 100 can receive the geographic location data defined via the mobile computing device 200 of the user 302 and the image data generated by the mobile computing device 200. As noted above, the geographic location data can be indicative of the device position of the mobile computing device 200 of the user 302, and the image data can be indicative of the surrounding position 306 nearby the device position. The direction system 118 of the autonomous vehicle 100 can set the requested vehicle position for the trip of the user 302 in the autonomous vehicle 100 based on the geographic location data and the image data. Moreover, the direction system 118 of the autonomous vehicle 100 can generate a route from a current vehicle position of the autonomous vehicle 100 to the requested vehicle position for the trip of the user 302 in the autonomous vehicle 100. Subsequent to generating the route, the control system 122 of the autonomous vehicle 100 may control at least one of the vehicle propulsion system 106, the braking system 108, or the steering system 110 to cause the autonomous vehicle 100 to follow the route to the requested vehicle position.

Responsive to an arrival of the autonomous vehicle 100 at the requested vehicle position (e.g., on the street adjacent to the surrounding position 306), the autonomous vehicle 100 may transmit a message to the mobile computing device 200 (e.g., directly, via a network) indicative of the arrival of the autonomous vehicle 100 at the requested vehicle position. The message may also include data indicative of the position of the autonomous vehicle; yet, the claimed subject matter is not so limited.

The mobile computing device 200 may receive input from the user causing the mobile computing device 200 to capture a second image utilizing the camera 214 (e.g., after receiving the message indicative of the arrival of the autonomous vehicle 100). Subsequent to capturing the second image, the mobile computing device 200 may display a GUI on the display 208 of the mobile computing device 200. The GUI can include the second image captured utilizing the camera and a graphical overlay. The graphical overlay can indicate a presence of the autonomous vehicle 100 at the requested vehicle position. The graphical overlay can highlight the autonomous vehicle 100 within the second image with visual indicia. In an example, the visual indicia can be coloring, a pattern, or the like that overlays the second image. The mobile computing device 200 can generate the graphical overlay of the GUI based on the second image and data included in the message received from the autonomous vehicle 100 indicating that the autonomous vehicle has arrived at the requested vehicle position. Pursuant to an illustration, the second image may be generated from a live-view of video obtained using the camera 214 of the mobile computing device 200. For instance, as a field of view of the camera 214 is changed over time, the mobile computing device 200 may modify the GUI to allow for identifying the autonomous vehicle 100 (e.g., shown via the graphical overlay on the live-view of the video). Thus, the camera 214 of the mobile computing device 200 can be used by the user 302 to identify that the autonomous vehicle 100 has been assigned to provide a ride to the user 302 (e.g., enabling the user to disambiguate between vehicles by holding up the mobile computing device 200 and viewing the image captured by the camera 214 on the display 208 to identify the correct autonomous vehicle 100, the overlay displayed on the display 208 can signify the correct autonomous vehicle 100 for the user 302).

In an embodiment, subsequent to the autonomous vehicle 100 arriving at the requested vehicle position, the mobile computing device 200 can receive direction data indicative of a path (e.g., from a current position of the user 302) to the requested vehicle position. The mobile computing device 200 may display the direction data as part of the GUI on the display 208 of the mobile computing device 200 (e.g., presented to the user 302). In a specific example, displaying the direction data may include presenting a series of graphical arrows within the graphical overlay of the GUI. Each arrow in the series of arrows may indicate a step to take in order to reach the requested vehicle position at which the autonomous vehicle 100 is located. Accordingly, when the autonomous vehicle 100 arrives at a destination, the user 302 can utilize the camera 214 of the mobile computing device 100 to capture image(s) (e.g., video) and the display 208 of the mobile computing device 100 to display the image(s) along with spatial instructions and cues to find the autonomous vehicle 100.

In an example, an image can be captured utilizing the camera 214 of the mobile computing device 200 subsequent to the arrival of the autonomous vehicle 100 at the requested vehicle position. At least a portion of the autonomous vehicle 100 can be depicted in this image. Accordingly, the autonomous vehicle can be authenticated by the camera annotation system 206 of the mobile computing device 200 based on the image. Moreover, responsive to authenticating the autonomous vehicle 100, an authentication notification that indicates authentication of the autonomous vehicle 100 in the image can be transmitted from the mobile computing device 200 to the autonomous vehicle 302 (e.g., directly, by way of the network). The authentication notification can be received by the autonomous vehicle 100; responsive to receipt of the authentication notification from the mobile computing device 200, the autonomous vehicle 100 can cause a door (or doors) of the autonomous vehicle 100 to unlock.

While the above-described process has been described with reference to a pick-up location of the user 302, it is to be understood that the above-described techniques may also be utilized for a drop-off location of the user 302. For instance, prior to or subsequent to the autonomous vehicle 100 arriving at the position within the sub-region 306, the mobile computing device 200 may receive input from the user 302 causing the mobile computing device 200 to transmit the geographic location data and the image data to the autonomous vehicle 100; again, such data can be utilized to control setting the requested vehicle position for the trip of the user 302 in the autonomous vehicle 100 (e.g., the drop-off location for the trip of the user 302 in the autonomous vehicle 100).

Accordingly, it is to be appreciated that the requested vehicle position can be a pick-up location for the trip of the user 302 in the autonomous vehicle 100. Alternatively, it is contemplated that the requested vehicle position can be a drop-off location for the trip of the user 302 in the autonomous vehicle 100. Further, a drop-off location or a pick-up location for the trip of the user 302 in the autonomous vehicle 100 can be adjusted utilizing the techniques set forth herein (e.g., the drop-off location can be changed to the requested vehicle position while the user 302 is riding in the autonomous vehicle 100 utilizing the techniques set forth herein).

Figure 4:
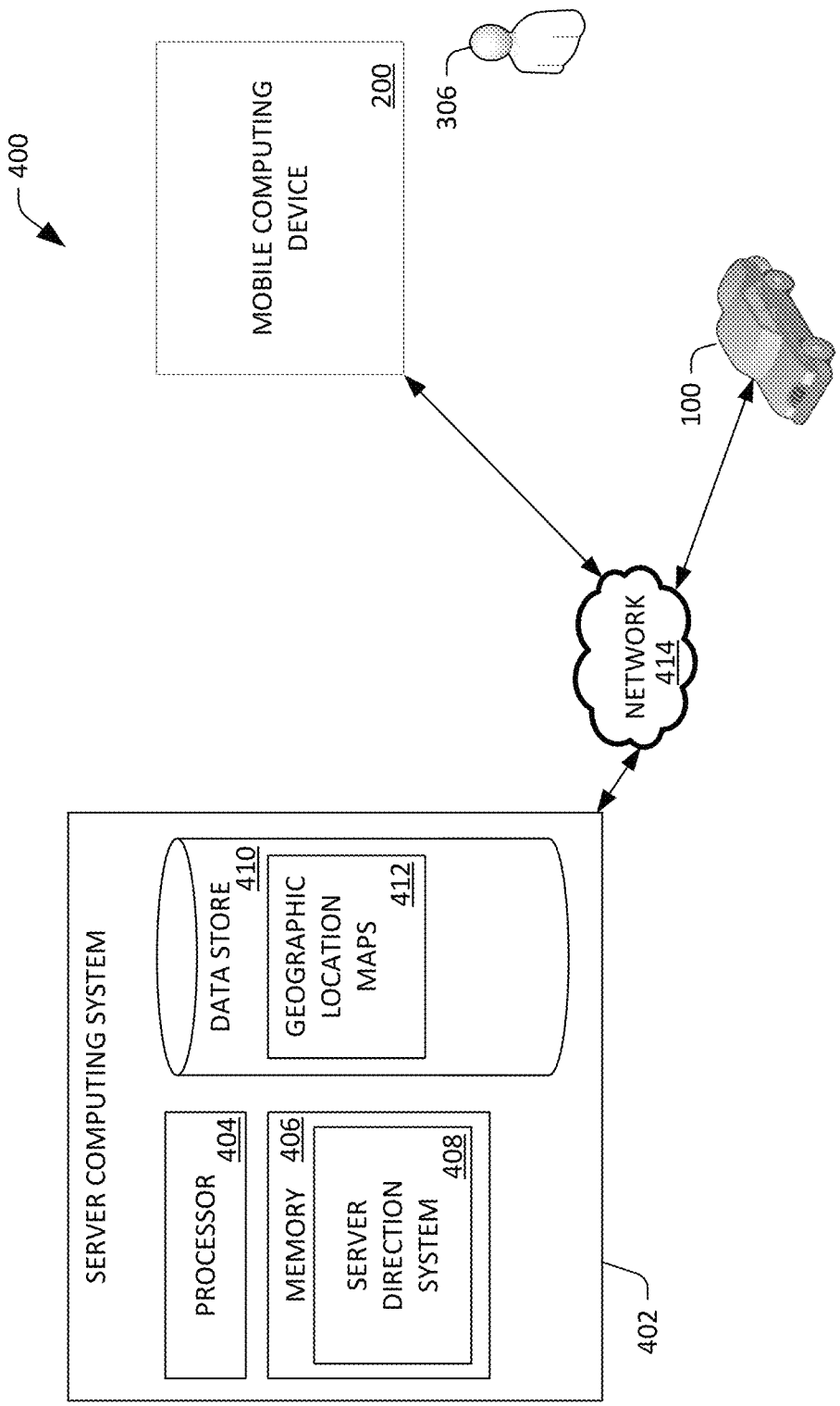
FIG. 4 illustrates a functional block diagram of a computing environment that facilitates navigating an autonomous vehicle based upon image data received from a mobile computing device.

Turning now to FIG. 4, an exemplary computing environment 400 that facilitates navigating an autonomous vehicle based upon image data received from a mobile computing device is illustrated. The computing environment 400 includes a server computing system 402. The server computing system 402 comprises a processor 404 and memory 406, wherein the memory 406 has a server direction system 408 loaded therein. In general, the server direction system 408 is configured to communicate with the direction system 118 of the autonomous vehicle 100 and/or the camera annotation system 206 of the mobile computing device 200 in order to effectuate navigation of the autonomous vehicle 100 based upon an image received from the mobile computing device 200. The server direction system 408 is also configured to communicate with the camera annotation system 206 in order to facilitate displaying the GUI on the display 208 of the mobile computing device 200.

The computing device 402 may also include a data store 410. The data store 410 may comprise geographic location maps 412. Data from the geographic location maps 412, for instance, can be retrieved by the autonomous vehicle 100 and utilized to generate the route from the current vehicle position of the autonomous vehicle 100 to the requested vehicle position for the trip of the user in the autonomous vehicle 100.

The computing environment 400 additionally includes the autonomous vehicle 100 and the mobile computing device 200 operated by the user 302. The server computing system 402 is in communication with the autonomous vehicle 100 and the mobile computing device 200 by way of a network 414 (e.g., the Internet). Additionally, the autonomous vehicle 100 and the mobile computing device 200 may be in communication by way of the network 414.

The foregoing techniques described in connection with FIGS. 1-3 can be performed in the computing environment 400. Moreover, it is contemplated that some of the operations described above as being executed by the autonomous vehicle 100 and/or the mobile computing device 200 may be performed by the server computing system 402. For instance, the server computing system 402 may receive the geographic location data from the mobile computing device 200. The server computing system 402 may also receive an image captured by the camera 214 of the mobile computing device 200 when the mobile computing device 200 is located at the device position. Following this example, the server direction system 408 can select a surrounding position nearby the device position, where the surrounding position is selected by the server direction system 408 based on the image. Additionally, a requested vehicle position for a trip of the user 306 in the autonomous vehicle 100 can be identified by the server direction system 408 based on the geographic location data and the surrounding position. The server direction system 408 can further transmit a command to the autonomous vehicle 100 to cause the autonomous vehicle 100 to traverse to the requested vehicle position for the trip of the user 306 in the autonomous vehicle 100.

According to an example, the server computing system 402 can also the route from the current position of the autonomous vehicle 100 to requested vehicle position; yet, the claimed subject matter is not so limited. Pursuant to another example, when the autonomous vehicle 100 arrives at the requested vehicle position, the autonomous vehicle 100 may transmits a message to the server computing system 402 indicating that the autonomous vehicle 100 has arrived at the requested vehicle position. Responsive to receiving the message, the server computing system 402 may transmit data causing a GUI to be presented on the display 208 of the mobile computing device 200. The GUI can include a current image captured by the camera 214 of the mobile computing device 200 and a graphical overlay. The graphical overlay can indicate a presence of the autonomous vehicle 100.

Figure 5:
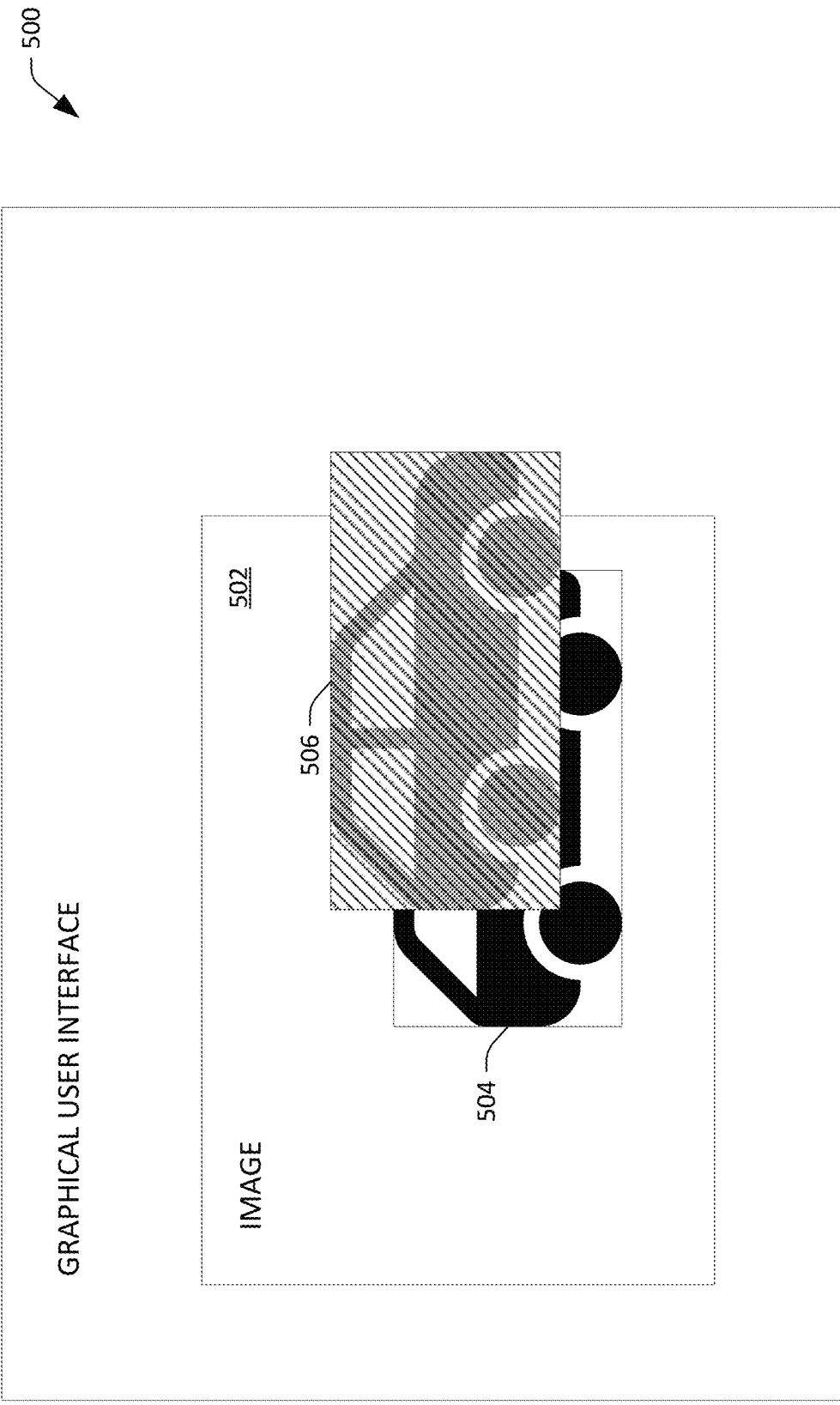
FIG. 5 illustrates a functional block diagram of an exemplary graphical user interface displayed on a display of a mobile computing device that indicates a presence of an autonomous vehicle with a graphical overlay.

Referring now to FIG. 5, an exemplary GUI 500 is illustrated. The GUI 500 may be used in accordance with the technologies described above. The GUI includes an image 502 (e.g., the second image) comprising an autonomous vehicle 504, as well as a graphical overlay 506 to the image 502. The graphical overlay 506 highlights the autonomous vehicle 504. In an example, multiple vehicles and/or multiple autonomous vehicles may also be present in the image 502 in addition to the autonomous vehicle 504. As such, the user 302 may be unaware of which vehicle is the autonomous vehicle 504. In an embodiment, the graphical overlay 506 may highlight the autonomous vehicle 504 with visual indicia, such as coloring. The mobile computing device 200 can generate the graphical overlay 506 based on the current image and/or data included in a message received from the autonomous vehicle 504 indicating that the autonomous vehicle 504 has arrived at the requested vehicle position.

In another embodiment, subsequent to the autonomous vehicle 100 arriving at the requested vehicle position, the autonomous vehicle 100 may cause direction data to be received by the mobile computing device 200. The direction data may be indicative of a path from the position of the user 302 to the position of the autonomous vehicle 100. The mobile computing device 200 may then cause the direction data to be presented to the user 302 within the GUI 500. In a specific example, causing the direction data to be presented to the user 302 may comprise presenting a series of graphical arrows within the GUI 500. Each arrow in the series of arrows may indicate a step that user 302 is to take in order to reach the position of the autonomous vehicle 100.

In an additional feature, the mobile computing device 200 may cause venue information to be presented to the user 302 within the GUI 500. The venue information can be presented as a graphical overlay 506 onto the image 502 include a name of the venue, a review of the venue, a recommendation for the user 302, etc. The mobile computing device 200 can then receive input to select the graphical overlay 506 and further receive input to save the venue into a profile of the user 302. It is noted that multiple locations and venues can be saved into the profile of the user 302. Furthermore, it is also noted that the mobile computing device 200 can receive input to save multiple location and venues in a sequential order (forming a string of locations and venues) to the profile of the user 302. The mobile computing device 200 can then receive input to share a location or a string of locations with a second mobile computing device of a second user.

According to an example, the GUI 500 displayed on the display 208 of the mobile computing device 200 can include predefined points of interest overlaid over image(s) (e.g., video) captured by the camera 214 of the mobile computing device 200. Following this example, the user can select one of more of the predefined points of interest (e.g., to set a requested vehicle position). Moreover, it is contemplated that the user can pick a user supplied point via the GUI 500 (e.g., a point that is not a predefined point of interest). Accordingly, the image(s) captured by the camera 214 can provide a view that acts as a guide as well as an interactive element for controlling operation of the autonomous vehicle 100.

Pursuant to another example, the GUI 500 can show ratings as part of the overlay 506. By way of example, a rating of a restaurant can be shown over an image of the restaurant through the camera view displayed as part of the GUI 500 on the display 208 of the mobile computing device 200. Further, as described herein, the user can select the restaurant (e.g., if the user desires to set a drop-off location to a position adjacent to the restaurant).

According to another example, it is to be appreciated that a GUI similar to the GUI 500 can be projected on a window inside an autonomous vehicle. The GUI projected on the window can enable similar interactions by the user as compared to interactions with the GUI 500 on the display 208 of the mobile computing device 200.

In accordance with a further example, the GUI 500 can be a rideshare map interface. Following this example, the user can customize and share place titles on the rideshare map interface. For instance, the user may annotate his or her notes (or notes of another user) via the camera view included in the GUI 500.

Figure 6:
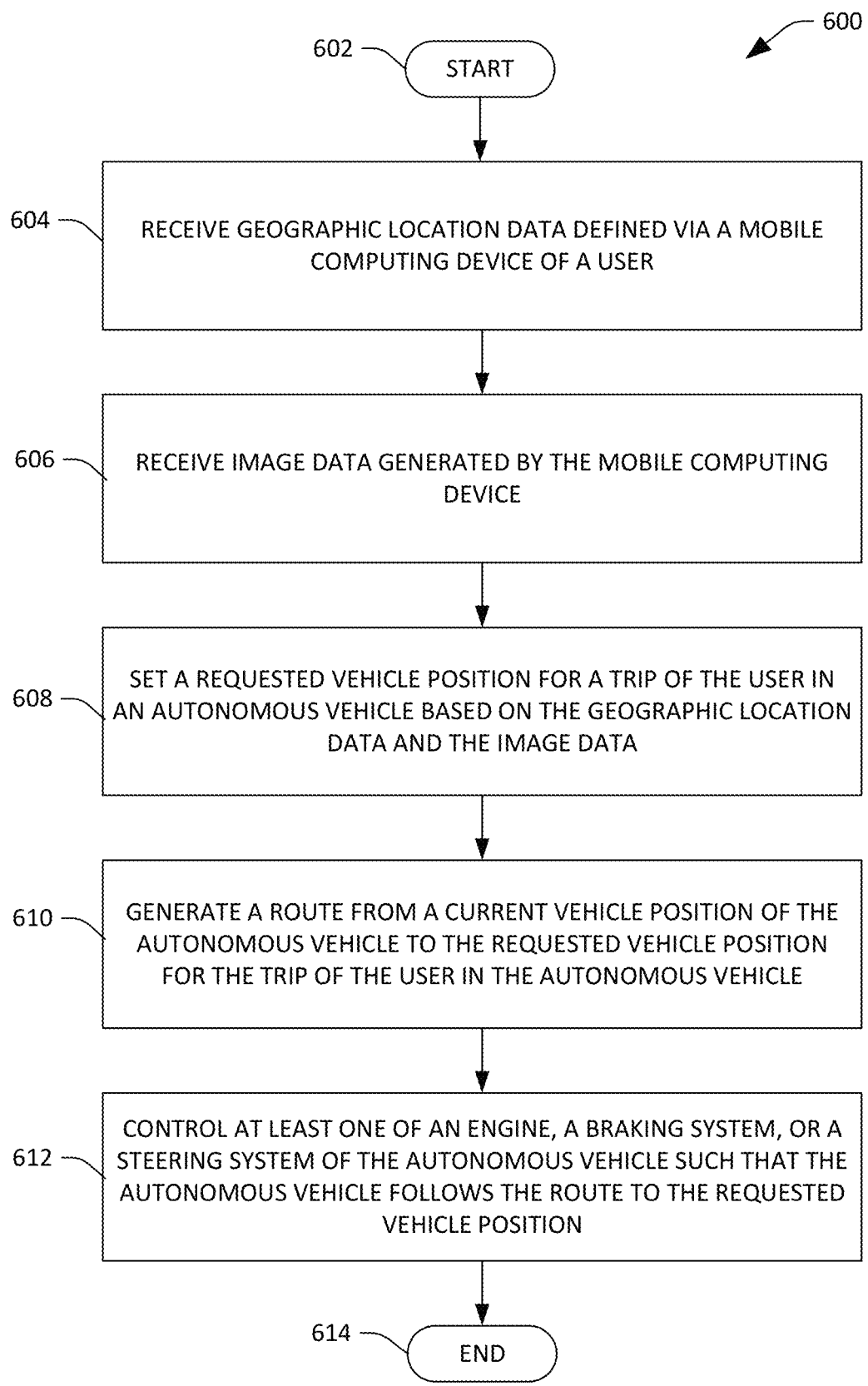
FIG. 6 is a flow diagram that illustrates an exemplary methodology for navigating an autonomous vehicle based upon image data received from a mobile computing device.
Figure 7:
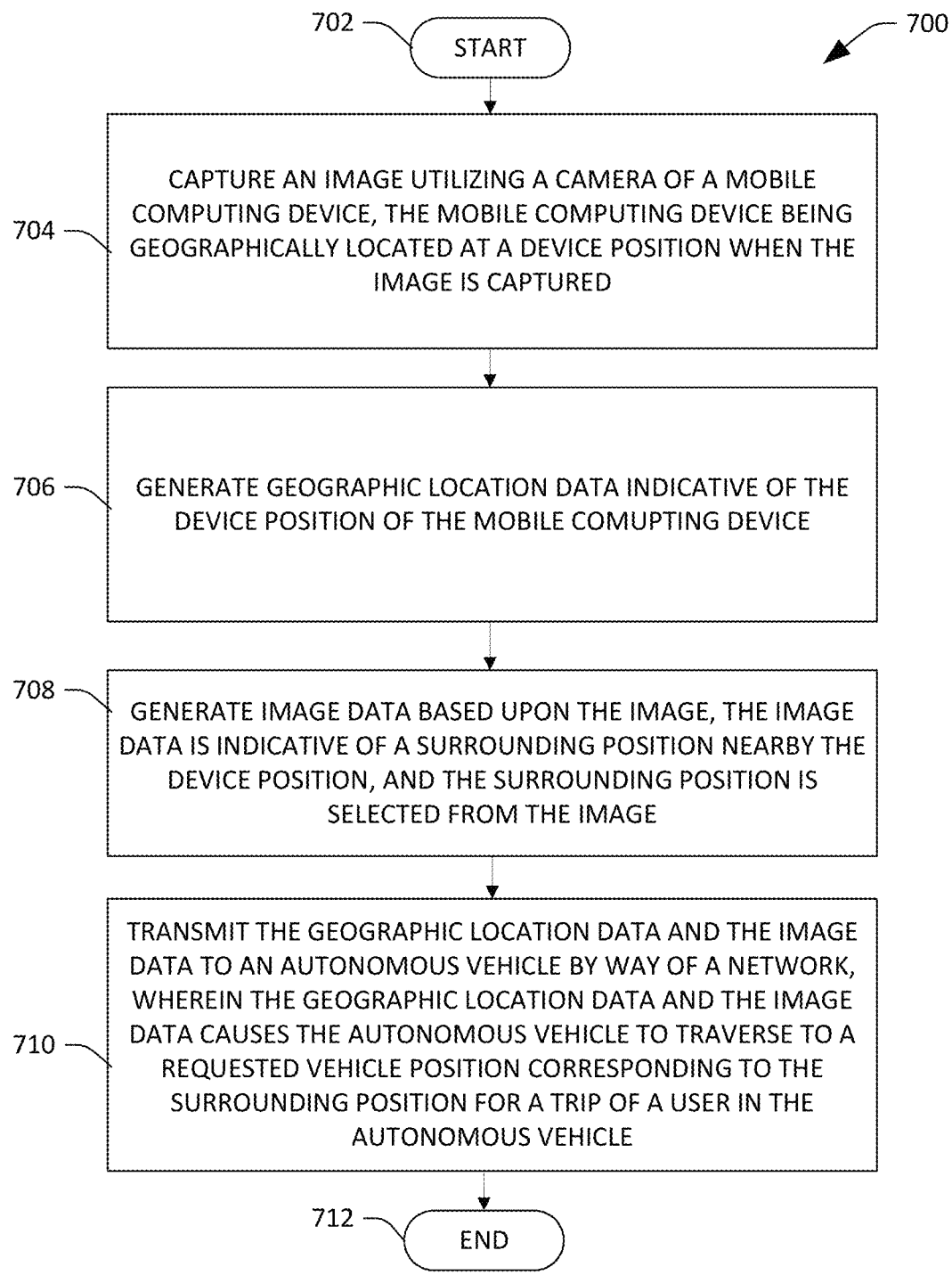
FIG. 7 is a flow diagram that illustrates an exemplary methodology for controlling an autonomous vehicle utilizing a camera of the mobile computing device.
Figure 8:
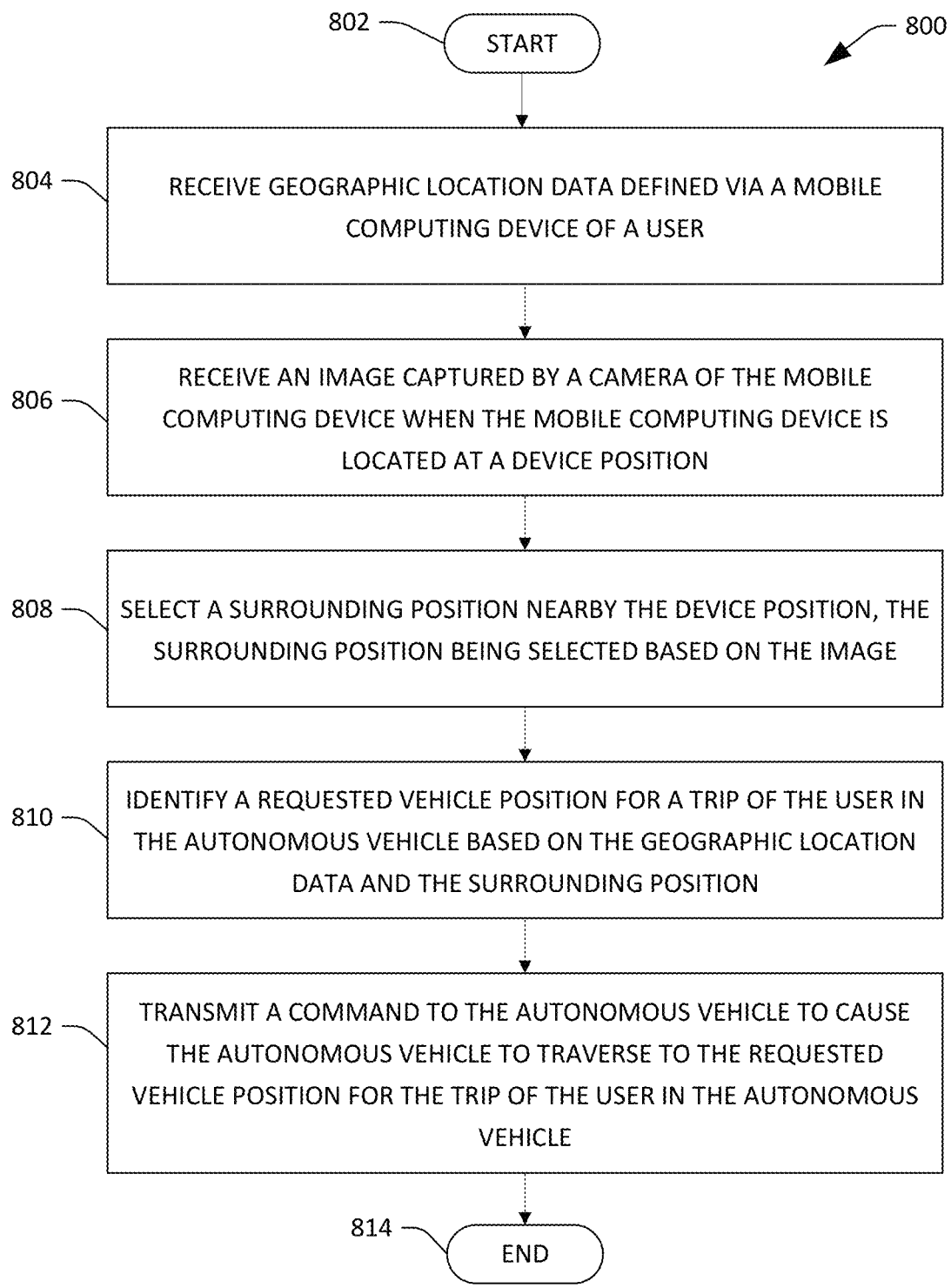
FIG. 8 is a flow diagram that illustrates an exemplary methodology executed by a server computing system for causing an autonomous vehicle to navigate based upon an image captured by a mobile computing device.

FIGS. 6-8 illustrate exemplary methodologies relating to controlling an autonomous vehicle based upon an image captured by a camera of a mobile computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 executed by an autonomous vehicle for navigating the autonomous vehicle based upon image data received from a mobile computing device of a user is illustrated. The methodology 600 begins at 602, and at 604, geographic location data defined via the mobile computing device of the user can be received. The geographic location data is indicative of a device position of the mobile computing device of the user. At 606, image data generated by the mobile computing device can be received. The image data is indicative of a surrounding position nearby the device position. Moreover, the surrounding position is selected from an image captured by a camera of the mobile computing device when the mobile computing device is located at the device position.

At 608, a requested vehicle position can be set for a trip of the user in the autonomous vehicle based on the geographic location data and the image data. At 610, a route can be generated from a current vehicle position of the autonomous vehicle to the requested vehicle position for the trip of the user in the autonomous vehicle. At 612, at least one of a vehicle propulsion system, a braking system, and/or a steering system of the autonomous vehicle can be controlled such that the autonomous vehicle follows the route to the requested vehicle position. The methodology 600 concludes at 614.

Turning now to FIG. 7, an exemplary methodology 700 executed by a mobile computing device to control an autonomous vehicle utilizing a camera of the mobile computing device is illustrated. The methodology 700 begins at 702, and at 704, an image can be captured utilizing the camera of the mobile computing device. The mobile computing device can be geographically located at a device position when the image is captured. At 706, geographic location data indicative of a device position of the mobile computing device can be generated. At 708, image data can be generated based upon the image. The image data is indicative of a surrounding position nearby the device position. Moreover, the surrounding position is selected from the image. At 710, the geographic location data and the image data can be transmitted to the autonomous vehicle by way of a network. The geographic location data and the image data can cause the autonomous vehicle to traverse to a requested vehicle position corresponding to the surrounding position for a trip of a user in the autonomous vehicle. The methodology 700 ends at 712.

Referring now to FIG. 8, an exemplary methodology 800 executed by a server computing system for causing an autonomous vehicle to navigate based upon an image captured by a mobile computing device is depicted. The methodology 800 begins at 802, and at 804, geographic location data defined via the mobile computing device of the user can be received. The geographic location data can be indicative of a device position of the mobile computing device of the user. At 806, an image captured by a camera of the mobile computing device when the mobile computing device is located at the device position can be received.

At 808, a surrounding position nearby the device position can be selected. The surrounding position can be selected (by the server computing system) based on the image. According to various examples, the surrounding position can be selected based on a central point in the image, an object detected in the image, or the like. At 810, a requested vehicle position for a trip of the user in the autonomous vehicle can be identified based on the geographic location data and the surrounding position. At 812, a command can be transmitted to the autonomous vehicle to cause the autonomous vehicle to traverse to the requested vehicle position for the trip of the user in the autonomous vehicle. The requested vehicle position can be a pick-up location or a drop-off location for the trip of the user in the autonomous vehicle.

Figure 9:
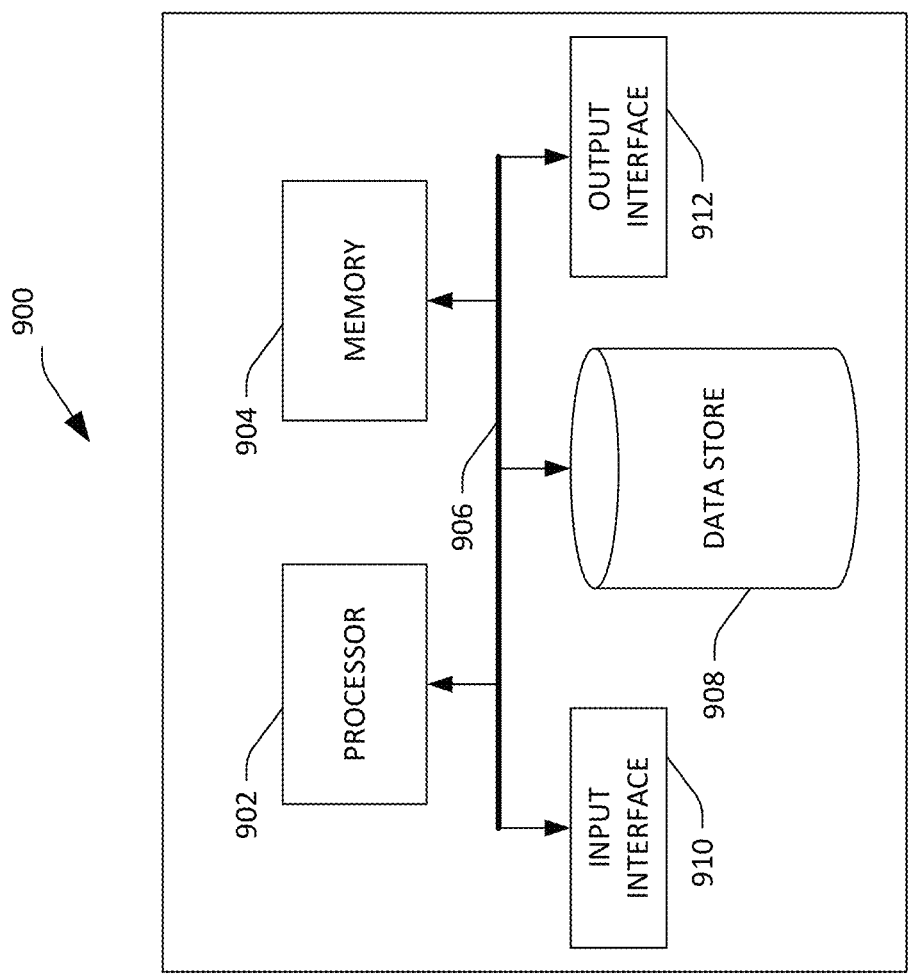
FIG. 9 is an exemplary computing device.

Referring now to FIG. 9, a high-level illustration of an exemplary computing device 900 that can be used in accordance with the systems and methodologies disclosed herein is illustrated. For instance, the computing device 900 may be or include the computing system 112. According to another example, the computing device 900 may be or include the mobile computing device 200. In accordance with yet another example, the server computing system 402 can be or include the computing device 900. The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. The processor 902 may be a CPU, a GPU, a plurality of GPUs, a multi-core processor, etc. The processor 902 may access the memory 904 by way of a system bus 906. In addition to storing executable instructions, the memory 904 may also store geographic location data, image data, etc.

The computing device 900 additionally includes a data store 908 that is accessible by the processor 902 by way of the system bus 906. The data store 908 may include executable instructions, geographic location data, image data, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. An autonomous vehicle, comprising:
a vehicle propulsion system;
a braking system;
a steering system; and a computing system that is in communication with the vehicle propulsion system, the braking system, and the steering system, the computing system comprising:
a processor;
memory storing instructions that, when executed by the processor, cause the processor to perform acts comprising:
receiving geographic location data of a mobile computing device of a user, the geographic location data is indicative of a device position of the mobile computing device of the user;
receiving image data generated by the mobile computing device while the user is riding in the autonomous vehicle during a trip in the autonomous vehicle, the image data is indicative of a predefined point of interest, wherein the predefined point of interest is within a field of view of a camera of the mobile computing device when the mobile computing device is located at the device position such that an image captured by the camera of the mobile computing device comprises at least a representation of the predefined point of interest, wherein the predefined point of interest is selected from the image captured by the camera of the mobile computing device, and wherein the predefined point of interest is a distance from the device position;
setting a drop-off location for the trip of the user in the autonomous vehicle based on the geographic location data and the image data, wherein the drop-off location is set to be a vehicle stopping location adjacent to the predefined point of interest at the distance from the device position, and wherein the autonomous vehicle is desirably caused to stop adjacent to the predefined point of interest where the vehicle stopping location adjacent to the predefined point of interest is separate from the device position of the mobile computing device;
generating a route from a current vehicle position of the autonomous vehicle to the drop-off location for the trip of the user in the autonomous vehicle; and
controlling at least one of the vehicle propulsion system, the braking system, or the steering system such that the autonomous vehicle follows the route to the drop-off location.

2. The autonomous vehicle of claim 1, wherein the drop-off location is adjusted while the user is riding in the autonomous vehicle responsive to the image being captured by the camera of the mobile computing device while the user is riding in the autonomous vehicle.

3. The autonomous vehicle of claim 1, the acts further comprising:
responsive to an arrival of the autonomous vehicle at the drop-off location, transmitting a message indicative of the arrival of the autonomous vehicle at the drop-off location to the mobile computing device.

4. The autonomous vehicle of claim 1, wherein the geographic location data comprises at least one of global position system (GPS) coordinates, an address, an intersection of roads, or a name of a location.

5. The autonomous vehicle of claim 1, wherein the image data comprises the distance from the device position to the predefined point of interest, a cardinal orientation of the camera of the mobile computing device when the image is captured, or data identifying the predefined point of interest.

6. The autonomous vehicle of claim 1, the acts further comprising:
receiving the image captured by the camera of the mobile computing device.

7. The autonomous vehicle of claim 1, wherein the predefined point of interest is automatically selected from the image.

8. The autonomous vehicle of claim 1, wherein the predefined point of interest is selected based on user input received via the mobile computing device.

9. A mobile computing device, comprising:
a camera;
a processor; and
memory storing instructions that, when executed by the processor, cause the processor to perform acts comprising:
capturing an image utilizing the camera of the mobile computing device while a user of the mobile computing device is riding in the autonomous vehicle during a trip in the autonomous vehicle, the mobile computing device being geographically located at a device position when the image is captured, wherein a predefined point of interest is within a field of view of the camera such that the image captured by the camera comprises at least a representation of the predefined point of interest;
generating image data based upon the image, the image data is indicative of the predefined point of interest, the predefined point of interest is selected from the image, and the predefined point of interest is a distance from the device position; and
causing geographic location data indicative of the device position of the mobile device and the image data to be transmitted to an autonomous vehicle by way of a network, wherein the geographic location data and the image data cause the autonomous vehicle to traverse to a drop-off location which is a vehicle stopping location adjacent to the predefined point of interest at the distance from the device position for the trip of the user in the autonomous vehicle, and wherein the autonomous vehicle is desirably caused to stop adjacent to the predefined point of Interest where the vehicle stopping location adjacent to the predefined point of interest is separate from the device position of the mobile computing device.

10. The mobile computing device of claim 9, further comprising:
a display;
wherein the acts further comprise:
subsequent to capturing the image, displaying the image on the display; and
receiving user input specifying a selection of the predefined point of interest within the image displayed on the display, wherein the image data generated based upon the image comprises data indicative of the predefined point of interest that is selected.

11. The mobile computing device of claim 9, wherein generating the image data based upon the image comprises at least one of:
determining the distance from the device position to the predefined point of interest; or
determining a cardinal orientation of the camera of the mobile computing device when the image is captured.

12. The mobile computing device of claim 9, wherein the geographic location data and the image data are transmitted to the autonomous vehicle by way of a network to adjust the drop-off location for the trip of the user in the autonomous vehicle, and wherein the drop-off location for the trip is adjusted while the user is riding in the autonomous vehicle.

13. The mobile computing device of claim 9, wherein the predefined point of interest is automatically selected from the image.

14. The mobile computing device of claim 9, further comprising:
   a display;
   wherein the acts further comprise:
      displaying a graphical user interface (GUI) on the display, the GUI comprises the image captured utilizing the camera and a graphical overlay, wherein the graphical overlay comprises venue information pertaining to the predefined point of interest.

15. The mobile computing device of claim 14, wherein the venue information comprises a venue name of the predefined point of interest.

16. The mobile computing device of claim 14, wherein the venue information comprises a venue review of the predefined point of interest.

17. A method executed by a processor of a server computing system that is in network communication with an autonomous vehicle and a mobile computing device operated by a user, the method comprising:
   receiving geographic location data of the mobile computing device of the user, the geographic location data is indicative of a device position of the mobile computing device of the user;
   receiving an image captured by a camera of the mobile computing device when the mobile computing device is located at the device position, wherein the image is captured by the camera of the mobile computing device while the user is riding in an autonomous vehicle during a trip in the autonomous vehicle, wherein a predefined point of interest is within a field of view of the camera of the mobile computing device such that the image captured by the camera of the mobile computing device comprises at least a representation of the predefined point of interest;
   selecting the predefined point of interest, the predefined point of interest being selected based on the image, the predefined point of interest being a distance from the device position;
   setting a drop-off location for the trip of the user in the autonomous vehicle to be a vehicle stopping location adjacent to the predefined point of interest at the distance from the device position; and
   transmitting a command to the autonomous vehicle to cause the autonomous vehicle to traverse to the drop-off location for the trip of the user in the autonomous vehicle, wherein the autonomous vehicle is desirably caused to stop adjacent to the predefined point of interest where the vehicle stopping location adjacent to the predefined point of interest is separate from the device position of the mobile computing device.

18. The method of claim 17, wherein the predefined point of interest is automatically selected by the server computing system from the image responsive to receipt of the image from the mobile computing device.

19. The method of claim 17, wherein the drop-off location is adjusted while the user is riding in the autonomous vehicle responsive to the image being captured by the camera of the mobile computing device while the user is riding in the autonomous vehicle.

20. The method of claim 17, further comprising:
   receiving selection data from the mobile computing device, the selection data being based on user input received by the mobile computing device, wherein the predefined point of interest is further selected based on the selection data received from the mobile computing device.

* * * * *